(12) United States Patent
Yoshikawa et al.

(10) Patent No.: US 9,368,293 B2
(45) Date of Patent: Jun. 14, 2016

(54) SEPARATOR FOR POWER STORAGE DEVICE AND POWER STORAGE DEVICE

(71) Applicant: MURATA MANUFACTURING CO., LTD., Kyoto-fu, Nagaokakyo-Shi (JP)

(72) Inventors: Norihiro Yoshikawa, Nagaokakyo (JP); Ichiro Nakamura, Nagaokakyo (JP); Hisao Kawamura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 53 days.

(21) Appl. No.: 13/940,028

(22) Filed: Jul. 11, 2013

(65) Prior Publication Data

US 2013/0295441 A1 Nov. 7, 2013

Related U.S. Application Data

(63) Continuation of application No. PCT/JP2011/077048, filed on Nov. 24, 2011.

(30) Foreign Application Priority Data

Jan. 13, 2011 (JP) ................................. 2011-004636

(51) Int. Cl.
*H01G 11/52* (2013.01)
*H01M 2/16* (2006.01)
(Continued)

(52) U.S. Cl.
CPC ............... *H01G 11/52* (2013.01); *H01M 2/166* (2013.01); *H01M 10/052* (2013.01); *H01M 10/0585* (2013.01); *Y02E 60/122* (2013.01); *Y02E 60/13* (2013.01)

(58) Field of Classification Search
None
See application file for complete search history.

(56) References Cited

U.S. PATENT DOCUMENTS

2007/0178384 A1 8/2007 Kajita et al.
2009/0246614 A1* 10/2009 Kim et al. ..................... 429/145
(Continued)

FOREIGN PATENT DOCUMENTS

JP S60-249266 A 12/1985
JP 2002-43103 A 2/2002
(Continued)

OTHER PUBLICATIONS

Kouji Harnano et al.; "A fundamental performance evaluation of lithium rechargeable batteries using PTC functional electrodes/ceramic particle composite separators"; Battery Symposium in Japan, Abstract Volume, vol. 45, p. 542-543, 2004. (English translation is attached).
(Continued)

*Primary Examiner* — Patrick Ryan
*Assistant Examiner* — Christopher Domone
(74) *Attorney, Agent, or Firm* — Arent Fox LLP (57) ABSTRACT

Provide is a separator for a power storage device, which reliably prevents short circuits between positive and negative electrode layers while maintaining the permeating ions function, and effectively suppresses shrinkage, and a power storage device using the separator. The separator is composed of a composite material including inorganic microparticles and an organic binder, the composite material has a pigment volume concentration of 55% or more, and the inorganic microparticles have an average particle size in the range of 0.2 to 3.0 μm, and a general particle shape index in the range of 0.50 to 0.85. The composite material can have a pigment volume concentration in the range of 55 to 80%, or 55 to 65%.

20 Claims, 5 Drawing Sheets

(51) Int. Cl.
*H01M 10/052* (2010.01)
*H01M 10/0585* (2010.01)

(56) References Cited

U.S. PATENT DOCUMENTS

| | | | |
|---|---|---|---|
| 2009/0325058 A1* | 12/2009 | Katayama et al. | 429/142 |
| 2010/0112432 A1* | 5/2010 | Nishida et al. | 429/144 |
| 2010/0203396 A1 | 8/2010 | Murata | |
| 2010/0285348 A1* | 11/2010 | Murata et al. | 429/144 |

FOREIGN PATENT DOCUMENTS

| | | |
|---|---|---|
| JP | 2005-071978 A | 3/2005 |
| JP | 2005-276503 A | 10/2005 |
| JP | 2005-327680 A | 11/2005 |
| JP | 2007-188777 A | 7/2007 |
| JP | 2008-210541 A | 9/2008 |
| JP | 2008/210794 A | 9/2008 |
| WO | WO 2008149986 A1 | 12/2008 |

OTHER PUBLICATIONS

Haruyuki Yoneda et al.; "Development of microporous PE film which contributed to innovation of lithium ion battery"; National Institute of Advanced Industrial Science, Polymer Preprints, Japan vol. 58, No. 1., p. 34-36, 2009. (English translation attached).
Japanese Office Action issued for counterpart application JP 2012-552636, date of dispatch Jan. 21, 2014 (with English translation).
PCT/JP2011/077048 International Search Report, date of mailing Feb. 28, 2012.
PCT Written Opinion of the International Searching Authority, date of mailing Feb. 28, 2012.

* cited by examiner

SEPARATOR FOR POWER STORAGE DEVICE AND POWER STORAGE DEVICE

This is a continuation of application Serial Number PCT/JP2011/07710048, filed Nov. 24, 2011, the entire contents of which are incorporated herein by reference.

TECHNICAL FIELD

The present invention relates to a power storage device such as, for example, a lithium ion secondary battery, a lithium ion capacitor, and an electric double layer capacitor.

BACKGROUND ART

High-energy density power storage devices typified by a lithium ion secondary battery, a lithium ion capacitor, an electric double layer capacitor, and the like, are structured, for example, such that a power storage element configured by stacking a sheet-like electrode formed by coating a sheet-like current collector foil (such as aluminum foil or copper foil) with an active material (such as activated carbon, a lithium composite oxide, or carbon), with a sheet-like separator interposed therebetween for preventing short circuit due to contact between electrodes; and an electrolyte solution are housed in an outer packaging composed of an aluminum can, an aluminum laminate film or the like.

(1) Prior Art Using Separator of Polyethylene Microporous Membrane

As the power storage device described above, a lithium ion secondary battery has been proposed which uses a separator of a polyethylene microporous membrane (see Non-Patent Document 1).

It is common to use, as a separator in a lithium ion secondary battery, a polyethylene microporous membrane as described in Non-Patent Document 1. This is due to the fact that when the lithium ion secondary battery generates abnormal heat, the polyethylene is melted to block the micropores, thereby suppressing or preventing lithium ion permeation to shut down the current, so that a safety mechanism can be incorporated in the lithium ion secondary battery.

As the polyethylene microporous membrane described in Non-Patent Document 1, a monoaxially-oriented or biaxially-oriented film is typically used for improvement in strength; however, the stretching treatment of the film increases the crystallinity of the polyethylene, and also increases the shutdown temperature to around the thermal runaway temperature of the battery, leading to a problem with reliability.

In addition, there is a problem that strain is accumulated in the film by the stretching treatment, and when the film is exposed to high temperatures, the film is significantly shrunk by the residual stress.

Furthermore, an increase in energy density for lithium ion secondary batteries has been desired in recent years, and in the case of such higher-energy density lithium ion secondary batteries, for the reason mentioned above, it is difficult to ensure adequate safety with a polyethylene microporous membrane, and above all, it goes without saying that film shrinkage due to residual stress is fatal.

(2) Prior Art Using Separator of Composite Material Including Inorganic Powder (2-1) As a separator that is able to suppress such shrinkage as caused in the case of the polyethylene microporous membrane described above, a ceramic microparticle composite separator has been proposed which has ceramic microparticles (0.01 μm or 0.3 μm in grain size) and a binder resin combined with predetermined PVC (pigment volume concentration) (see Non-Patent Document 2).

In addition, patent documents also disclose the following separators as separators that are able to suppress shrinkage of resin layers:

(2-2) a microporous separator mainly containing a mixture of olefin plastic and hydrous silica (see Patent Document 1);

(2-3) a separator structured such that a resin layer is provided on at least one principal surface of a base material layer, where the resin layer includes an inorganic substance in a range of 1 nm to 10 μm in particle size (see Patent Document 2); and (2-4) a separator containing inorganic microparticles in which the number of particles of 0.3 μm or less in particle size and the number of particles of 1 μm or more in particle size are each 10% or more to the total number of inorganic microparticles (see Patent Document 3).

In the case of a separator of a composite material composed of an inorganic powder and an organic binder, such as the separators described in Non-Patent Document 2, and Patent Documents 1 to 3, it becomes possible to reduce the shrinkage problem as described above.

One of important functions of separators is the function of permeating ions (lithium ions in the case of a lithium ion secondary battery) while preventing short circuit between electrodes, and the separators in Non-Patent Document 2 and Patent Documents 1 to 3, which are prepared by binding, with the use of an organic binder, gaps filled with an inorganic powder, need adjustments to porosity and air permeability in order to secure the function of permeating lithium ions, and to that end, need proper adjustments to the filling property of the inorganic powder.

When an inorganic powder with a particle size distribution is packed as the foregoing inorganic powder, for example, smaller particles penetrate into gaps among larger particles as the particle size distribution is increased in breadth, and the porosity is thus decreased to make the powder densely packed.

However, Non-Patent Document 2 and Patent Documents 1 and 2 fail to describe the particle size distribution of the inorganic powder, and actually fail to present any specific measures for adjusting the porosity and air permeability of the separator.

On the other hand, Patent Document 3 describes the particle size distribution, but there is a concern that the inorganic powder is densely packed to make it impossible to ensure the lithium ion permeability required for the separator, because the configuration in Patent Document 3 provides the inorganic microparticles with a wide particle size distribution.

PRIOR ART DOCUMENTS

Patent Documents

Patent Document 1: Japanese Patent Application Laid-Open No. S60-249266
Patent Document 2: Japanese Patent Application Laid-Open No. 2007-188777
Patent Document 3: Japanese Patent Application Laid-Open No. 2008-210541

Non-Patent Documents

Non-Patent Document 1: Title: Development of Polyethylene Microporous Membrane contributed to Higher Performance of Lithium Ion Secondary Battery (Asahi Kasei Corporation/National Institute of Advanced Industrial Science), Polymer Preprints, Japan Vol. 58, No. 1, p. 34-36 (2009)

Non-Patent Document 2: Title: Basic Property Evaluation on Lithium Secondary Battery using PTC Functional Electrode/Ceramic Microparticle Composite Separator (Mitsubishi Electric Corporation), Battery Symposium in Japan, Abstract Volume, Vol. 45, p. 542-543 (2004)

SUMMARY OF THE INVENTION

Problem to be Solved by the Invention

The present invention is intended to solve the problems mentioned above, and an object thereof is to provide a separator for a power storage device, which is able to reliably prevent a short circuit between a positive electrode layer and a negative electrode layer while maintaining the function of permeating ions, and able to effectively suppress the shrinkage when heat is applied, and a power storage device using the separator.

Means for Solving the Problem

In order to solve the problems mentioned above, the separator for a power storage device according to the present invention is composite material including inorganic microparticles and an organic binder, the separator being for use in a power storage device structured such that a positive electrode layer and a negative electrode layer are stacked so as to be opposed to each other with a separator interposed therebetween, and housed along with an electrolyte solution in an outer packaging, wherein (a) the composite material has a pigment volume concentration PVC, which is represented by the following formula (1), of 55% or more, $$PVC = (\text{Volume of Inorganic Microparticles}) \div (\text{Volume of Inorganic Microparticles} + \text{Volume of Organic Binder}) \times 100 \quad (1)$$

provided that the Volume of Inorganic Microparticles=Weight of Inorganic Microparticles÷Density of Inorganic Microparticles, and
the Volume of Organic Binder=Weight of Organic Binder÷Density of Organic Binder; and (b) the inorganic microparticles have an average particle size in a range of 0.2 to 3.0 μm, and a general particle shape index in a range of 0.50 to 0.85, the general particle shape index being represented by the product of the degree of circularity for the inorganic microparticles represented by the following formula (2), and the degree of smoothness for the inorganic microparticles represented by the following formula (3), $$\text{Degree of Circularity} = \text{Equivalent Circle Diameter} \div \text{Equivalent Ellipse Major Axis} \quad (2)$$

$$\text{Degree of Smoothness} = \text{Equivalent Ellipse Outer Perimeter} \div \text{Outer Perimeter.} \quad (3)$$

In the separator for a power storage device according to the present invention, the composite material preferably has a pigment volume concentration PVC in a range of 55 to 80%.

Furthermore, the composite material more preferably has a pigment volume concentration PVC in a range of 55 to 65%.

Thus, the power storage device according to the present invention is a power storage device structured such that a positive electrode layer including a positive electrode active material and a current collector and a negative electrode layer including a negative electrode active material and a current collector are stacked so as to be opposed to each other with a separator interposed therebetween, and housed along with an electrolyte solution in an outer packaging, wherein the separator for a power storage device having a PVC as described above is used.

Advantages of the Invention

The separator for a power storage device according to the present invention is a separator for a power storage device, which is composed of a composite material including inorganic microparticles and an organic binder, and adapted to meet the requirements of: (a) the composite material with a pigment volume concentration of 55% or more; and (b) the inorganic microparticles with an average particle size of 0.2 to 3.0 μm and a general particle shape index of 0.50 to 0.85, so that it is possible to achieve a separator for a power storage device, which is able to prevent short circuit between a positive electrode layer and a negative electrode layer while maintaining the function of permeating ions, and able to suppress or prevent the shrinkage when heat is applied.

More specifically, when the requirements mentioned above are met, the pore volume and pore size of the composite material are increased to achieve a separator for a power storage device with high air permeability. In addition, the separator configured as described above makes it possible to suppress or prevent the shrinkage when heat is applied, and makes it possible to achieve a power storage device which has heat resistance, for example at 150° C. or higher.

It is to be noted that in the separator for a power storage device, which is composed of a composite material including inorganic microparticles and an organic binder, such as the separator for a power storage device according to the present invention, the porosity and air permeability are determined by the filling property of the inorganic microparticle.

Furthermore, the filling property of the inorganic microparticle is affected by the particle shape and particle size of the inorganic microparticle. When the particle shape of the inorganic microparticle is represented by the index referred to as the general particle shape index calculated from the product of the degree of circularity and the degree of smoothness, the inorganic microparticles are sparsely packed as the general particle shape index is smaller, and the porosity is increased. On the other hand, when the general particle shape index is excessively small, the micropore size will be excessively increased to make it difficult to suppress short circuit between electrodes.

The general particle shape index of the inorganic microparticle is defined to fall within a range of 0.50 to 0.85 in the present invention.

In the present invention, the average particle size of the inorganic microparticles is adjusted to 0.2 to 3.0 μm in a range of 0.50 to 0.85 for the general particle shape index. This is due to the fact that when the average particle size is smaller than 0.2 μm, the micropore size in the composite material is decreased to make it difficult to achieve the air permeability required for the separator for a battery, whereas when the average particle size is larger than 3.0 μm, the ratio of the inorganic microparticle size to the thickness (typically on the order of 10 to 30 μm) of the separator for a power storage device is increased to cause the problems of the decreased strength of the separator for a power storage device and the decreased function of suppressing short circuit between electrodes.

Furthermore, a pigment volume concentration PVC of the composite material in a range of 55 to 80% in the separator for a power storage device according to the present invention makes it possible to achieve a more preferable separator for a power storage device, which achieves a balance between the membrane property (strength) and the function of permeating lithium ions.

A pigment volume concentration PVC of the composite material in the range of 55 to 65% makes it possible to achieve a separator for a power storage device, which achieves a better balance between the membrane property (strength) and the function of permeating lithium ions, and makes it possible to make the present invention more effective.

Furthermore, a positive electrode layer including a positive electrode active material and a current collector and a negative electrode layer including a negative electrode active material and a current collector are stacked so as to be opposed to each other with a separator interposed therebetween in the power storage device according to the present invention, and housed along with an electrolyte solution in an outer packaging, and the separator for a power storage device according to the present invention is used as the separator, so that it is possible to provide a highly reliable power storage device which has excellent electrical characteristics and heat resistance.

DESCRIPTION OF THE INVENTION

Features of the present invention will be described in more detail with reference of an embodiment of the present invention below.

The separator for a power storage device according to the present invention is composed of a composite material including inorganic microparticles and an organic binder, and meets the requirements of: (a) the composite material have a pigment volume concentration of 55% or more; and (b) the inorganic microparticles have an average particle size of 0.2 to 3.0 µm and a general particle shape index of 0.50 to 0.85.

In addition, the separator for a power storage device according to the present invention is composed of a composite material in which inorganic microparticles that are chemically and electrochemically stable in the power storage device are bound with an organic binder that is likewise chemically and electrochemically stable in the power storage device.

Examples of the inorganic microparticles which satisfy the conditions mentioned above include oxides such as silica, alumina, titania, and barium titanate; and nitrides such as silicon nitride and aluminum nitride.

In the separator for a power storage device according to the present invention, the inorganic microparticles desirably have a general particle shape index in the range of 0.50 to 0.85. This general particle shape index is defined by the product of the degree of circularity and degree of smoothness for the inorganic microparticles. In addition, the degree of circularity and degree of smoothness for the inorganic microparticles are defined by the following formulas (2) and (3).

$$\text{Degree of Circularity} = \text{Equivalent Circle Diameter} \div \text{Equivalent Ellipse Major Axis} \quad (2)$$

$$\text{Degree of Smoothness} = \text{Equivalent Ellipse Outer Perimeter} \div \text{Outer Perimeter} \quad (3)$$

It is to be noted that the "Equivalent Ellipse Major Axis", "Outer Perimeter", and "Equivalent Circle Diameter" refer to values calculated by observing the inorganic microparticles under SEM and applying an image analysis to the obtained image.

The equivalent ellipse major axis refers to a longer diameter when an image of an inorganic microparticle observed under SEM is substituted with an elliptical shape with the area constant.

In addition, the outer perimeter refers to the length of the outer circumference in an image of the inorganic microparticle observed under SEM.

Furthermore, the equivalent circle diameter refers to a diameter when an image of an inorganic microparticle observed under a SEM is substituted with a circular shape with the area constant.

In addition, the average particle size of the inorganic microparticles is adjusted to 0.2 to 3.0 µm. This is due to the fact that when the average particle size is smaller than 0.2 µm, the micropore size in the composite material is decreased to make it difficult to achieve the air permeability required for the separator for a battery, whereas when the average particle size is larger than 3.0 µm, the ratio of the inorganic microparticle size to the thickness (typically on the order of 10 to 30 µm) of the separator for a power storage device is increased to decrease the strength of the separator for a power storage device and decrease the function of suppressing short circuits between electrodes.

Furthermore, examples of the organic binder which satisfies the condition mentioned above include epoxy, polyvinyl butyral, polyvinyl alcohol, polyethylene oxide, urethane, acrylic, ethyl cellulose, methyl cellulose, carboxymethyl cellulose, polyvinylidene fluoride, and the like.

In the separator for a power storage device according to the present invention, the PVC of the composite material is adjusted to 55% or more. It is to be noted that the PVC refers to pigment volume concentration, which is a value obtained from the formula (1).

$$\text{PVC} = (\text{Volume of Inorganic Microparticles}) \div (\text{Volume of Inorganic Microparticles} + \text{Volume of Organic Binder}) \times 100 \quad (1)$$

in which the Volume of Inorganic Microparticles=Weight of Inorganic Microparticles÷Density of Inorganic Microparticles, and the Volume of Organic Binder=Weight of Organic Binder÷Density of Organic Binder. If the pigment volume concentration PVC of the composite material is less than 55%, the volume of the organic binder present in gaps filled with the inorganic microparticles will be increased, and as a result, the porosity in the composite material will be unfavorably decreased.

In addition, a composite material sheet to serve as the separator for a power storage device according to the present invention is prepared in such a way that a slurry prepared by mixing the inorganic microparticles, the organic binder, and a solvent is cast onto a base material such as a carrier film or a metal roll by a doctor blade method or the like, dried, and then peeled from the base material.

The method for preparing the slurry includes, for example, two types of methods for preparing slurry: a method of using inorganic microparticles with a general particle shape index of 0.50 to 0.85 and an average particle size of 0.2 µm to 3.0 µm to prepare slurry without changing these properties; and a method of changing the properties of a power during slurry preparation to adjust the general particle shape index in a range of 0.50 to 0.85 and the average particle size in a range of 0.2 to 3.0 Examples of the former method include use of a homogenizer for mixing by rotation of a stirring wing and the like, whereas examples of the latter method include use of a ball mill and the like. In the present invention, it is also possible to use any slurry preparation methods.

In addition, examples of the power storage device according to the present invention include a lithium ion secondary battery, a lithium ion capacitor, an electric double layer capacitor, and the like. The power storage devices all have a common structure in that: a separator (the separator for a power storage device) for preventing short circuit between electrodes is placed between a positive electrode layer and a negative electrode layer; the positive electrode layer and the negative electrode layer are stacked so as to be opposed to each other with the separator interposed therebetween; and housed along with an electrolyte solution in an outer packaging.

Depending on the type of the power storage device, the following materials can be used as constituent materials of the devices.

Lithium Ion Secondary Battery

In a lithium ion secondary battery, for example, an aluminum foil is used as a positive electrode current collector layer, and as a positive electrode layer, an electrode is used which is obtained by providing, on the aluminum foil, a mixture layer containing a lithium composite oxide as a positive electrode active material layer.

In addition, for example, a copper foil is used as a negative electrode current collector layer, and as a negative electrode layer, an electrode is used which is obtained by providing, on the copper foil, a mixture layer containing graphite as a negative electrode active material layer.

A lithium ion secondary battery can be prepared by using as an electrolyte solution (non-aqueous electrolyte solution), a solution obtained by dissolving 1 mol/L $LiPF_6$ in a mixed solvent of ethylene carbonate and diethyl carbonate.

Lithium Ion Capacitor

In a lithium ion capacitor, for example, an aluminum foil is used as a positive electrode current collector layer, and as a positive electrode layer, an electrode is used which is obtained by providing, on the aluminum foil, a mixture layer containing activated carbon as a positive electrode active material layer. A copper foil is used as a negative electrode current collector layer, and as a negative electrode layer, an electrode is used which is obtained by providing, on the copper foil, a mixture layer containing graphite as a negative electrode active material layer, and the negative electrode layer is further pre-doped with lithium ions.

The lithium ion capacitor can be prepared by using, as an electrolyte solution (non-aqueous electrolyte solution), a solution obtained by dissolving 1 mol/L $LiPF_6$ in a mixed solvent of ethylene carbonate and diethyl carbonate.

Electric Double Layer Capacitor

In an electric double layer capacitor, an aluminum foil is used, for example, as a positive electrode current collector layer, and as a positive electrode layer, an electrode is used which is obtained by providing, on the aluminum foil, a mixture layer containing a carbon material, for example, activated carbon as a positive electrode active material layer. An aluminum foil is used as a negative electrode current collector layer, and as a negative electrode layer, an electrode is used which is obtained by providing, on the aluminum foil, a mixture layer containing a carbon material, for example, activated carbon. The electric double layer capacitor can be prepared by using, as an electrolyte solution, a solution obtained by dissolving 1 mol/L triethylmethyl ammonium tetrafluoroborate in propylene carbonate.

Example 1

The present invention will be described in detail with reference to examples directed to lithium ion secondary batteries.

Figure 1:
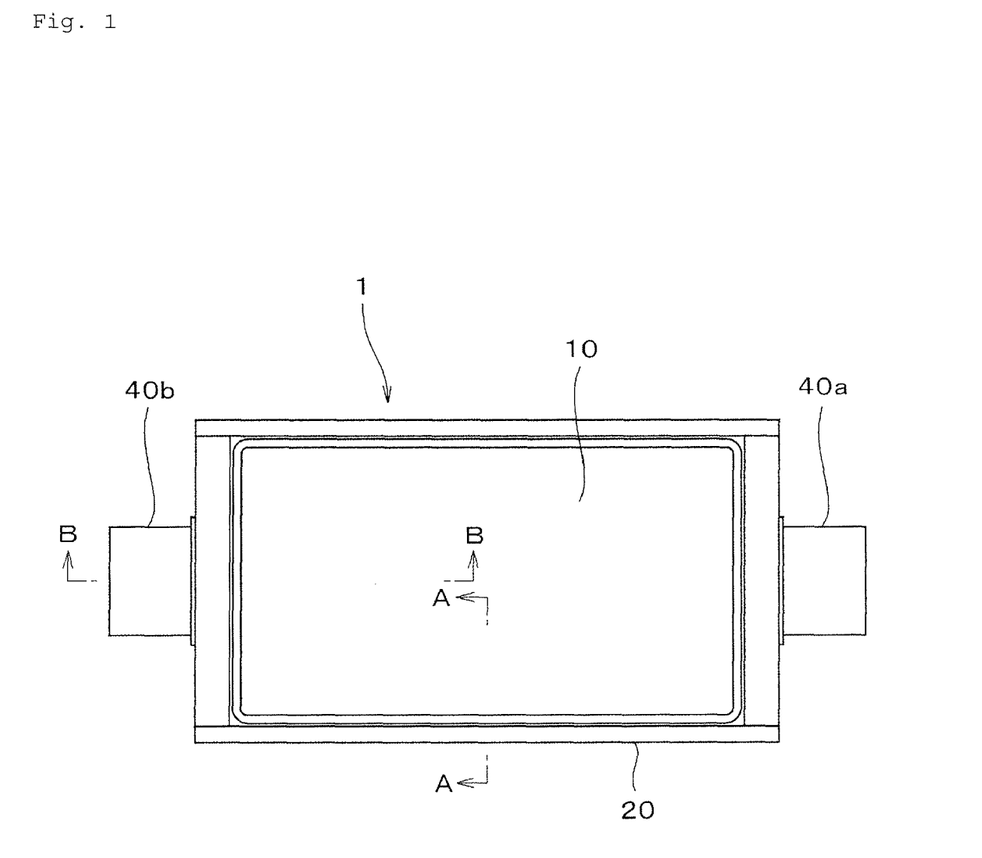
FIG. 1 is a plan view of a power storage device (lithium ion secondary battery) according to an example (Example 1) of the present invention.
Figure 2:
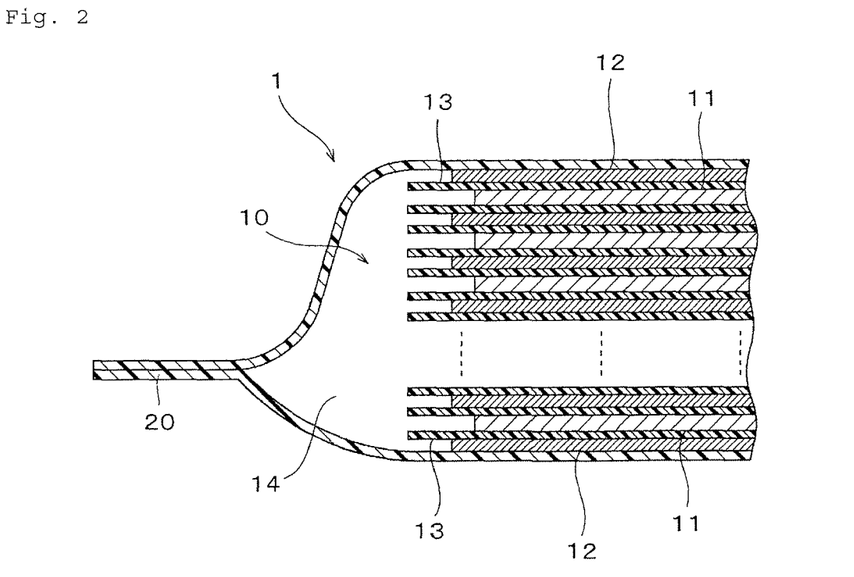
FIG. 2 is a cross-sectional view of FIG. 1 along the line A-A.
Figure 3:
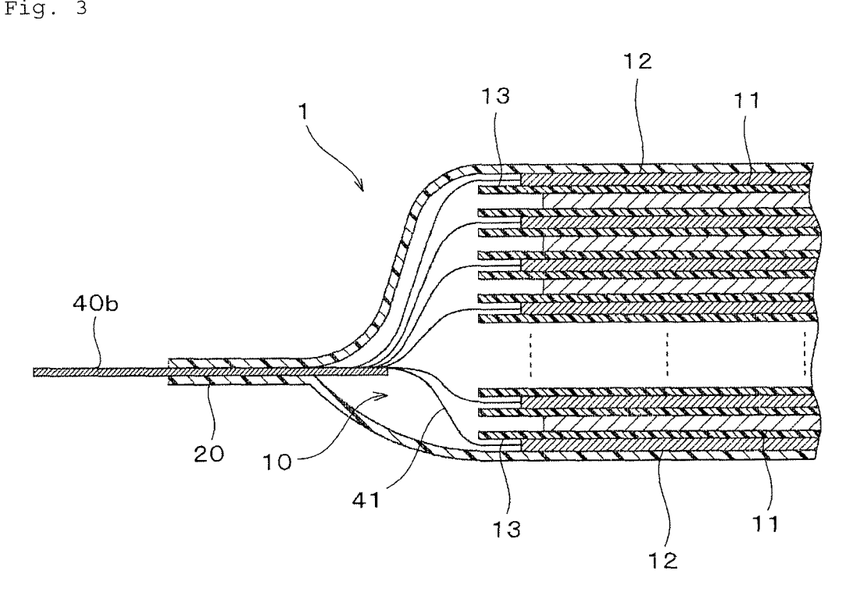
FIG. 3 is a cross-sectional view of FIG. 1 along the line B-B.

A lithium ion secondary battery 1 according to Example 1 include, as shown in FIGS. 1 to 3, a power storage element 10, an outer packaging 20 for housing and sealing the power storage element 10, a positive electrode terminal 40a and a negative electrode terminal 40b connected via a plurality of current collector members 41 (see FIG. 3) to the power storage element 10 and extracted from the outer peripheral edge of the outer packaging 20.

The power storage element 10 includes, see FIGS. 2 and 3, for example, positive electrode layers 11 obtained by providing, as a positive electrode active material layer, a mixture layer containing a lithium composite oxide on an aluminum foil; negative electrode layers 12 obtained by providing, as a negative electrode active material layer, a mixture layer containing graphite on a copper foil; separators (separators for a power storage separator) 13 as described below; and a non-aqueous electrolyte solution 14.

The plurality of positive electrode layers 11 and plurality of negative electrode layers 12 constituting the power storage element 10 are alternately stacked with the separators 13 interposed therebetween, and housed in an outer packaging 20, along with the non-aqueous electrolyte solution 14 obtained by dissolving 1 mol/L $LiPF_6$ in a mixed solvent of ethylene carbonate and diethyl carbonate.

As the outer packaging 20, an outer packaging is used which is composed of, for example, an aluminum laminate film obtained by integrally staking an outer protective film composed of a resin, an intermediate gas barrier layer composed of aluminum, and an inner adhesive layer composed of a resin.

In Example 1, as the separators 13 mentioned above, separators (separators for a power storage device) are used which are composed of composite material sheets prepared by a method as described below.

Preparation and Evaluation of Composite Material Sheet for Separator

In Example 1, a spherical silica powder and a crushed silica powder were used as inorganic microparticles constituting the composite material used as separators. The spherical silica powder is produced in such a way that a high-purity natural silica stone is subjected to fine grinding, sprayed into high-temperature flame for melting and spheroidizing at the same time, and then adjusted in particle size. On the other hand, the crushed silica powder can be produced in such a way that an ingot produced by high-temperature melting a high-purity natural silica stone is subjected to fine grinding, and then adjusted in particle size by classification. Then, the general particle shape index of the crushed silica powder was adjusted by the grinding condition.

Table 1 shows average particle sizes for silica powders (silica 1 to silica 7), which were measured by a laser diffraction particle size distribution measurement method. In addition, Table 1 shows general particle shape indices calculated by observing the respective silica powders under a SEM and applying an image analysis to the obtained images.

TABLE 1

|  | Silica 1 | Silica 2 | Silica 3 | Silica 4 | Silica 5 | Silica 6 | Silica 7 |
| --- | --- | --- | --- | --- | --- | --- | --- |
| Shape | Crushed | Crushed | Crushed | Crushed | Crushed | Spherical | Spherical |
| Average Particle Size | 1.6 | 1.8 | 1.5 | 1.1 | 1.3 | 1.2 | 1.0 |
| Degree of Circularity | 0.45 | 0.72 | 0.82 | 0.80 | 0.84 | 0.88 | 0.94 |
| Degree of Smoothness | 0.71 | 0.71 | 0.76 | 0.81 | 0.85 | 0.95 | 0.97 |
| General Particle Shape Index | 0.32 | 0.51 | 0.62 | 0.65 | 0.72 | 0.84 | 0.91 |
| Remarks | Outside Scope |  |  |  |  |  | Outside Scope |

It is to be noted that each of the respective silica powders (silica 1 to silica 7 in Table 1) used in Example 1 have a density of 2.21 g/cm$^3$.

Polyvinyl alcohol (degree of saponification: 98.5 mol %, degree of polymerization: 2400) was used as the organic binder. In addition, 1,2-propanediol was used as a plasticizer for the polyvinyl alcohol. The polyvinyl alcohol has a density of 1.25 g/cm$^3$ and the 1,2-propanediol has a density of 1.04 g/cm$^3$.

Then, the silica powder, an aqueous polyvinyl alcohol solution (concentration: 8% by weight), 1,2-propanediol as a plasticizer, and water as a solvent were put in a 500 mL beaker. A homogenizer (CLEARMIX manufactured by M Technique Co., Ltd.) was used for mixing at a rotation speed of 10000 rpm for 1 hour to prepare slurry. Table 2 shows specifications of the obtained slurries.

TABLE 2

| Type of Slurry | Slurry 1 | Slurry 2 | Slurry 3 | Slurry 4 | Slurry 5 | Slurry 6 | Slurry 7 |
| --- | --- | --- | --- | --- | --- | --- | --- |
| Silica | 100 | 100 | 100 | 100 | 100 | 100 | 100 |
| Water | 50 | 50 | 50 | 50 | 50 | 50 | 50 |
| Aqueous Polyvinyl Alcohol Solution | 339.7 | 339.7 | 339.7 | 339.7 | 339.7 | 339.7 | 339.7 |
| Propylene Glycol | 2.7 | 2.7 | 2.7 | 2.7 | 2.7 | 2.7 | 2.7 |
| PVC | 65% | 65% | 65% | 65% | 65% | 65% | 65% |
| Remarks | Silica 1 Outside Scope | Silica 2 | Silica 3 | Silica 4 | Silica 5 | Silica 6 | Silica 7 Outside Scope |

Each slurry in Table 2 was applied by a doctor blade method onto a silicone-coated PET film, and then dried to obtain composite material sheets of 15 μl in thickness (composite material sheets S1 to S7 in Table 3). It is to be noted that the composite material sheets S1 to S7 are sheets for use as separators in batteries (lithium ion secondary batteries) in Table 4 below. In addition, a polyethylene microporous membrane (20 μm in thickness) was prepared as a comparative example.

For the composite material sheets S1 to S7 prepared in the way described above and the polyethylene microporous membrane as a comparative example, the porosity, air permeability, strength, and shrinkage percentage during heating were checked by the following methods:

(1) Porosity

The thickness and weight were measured for the composite material sheets S1 to S7 and the polyethylene macroporous membrane as a comparative example, which were punched into a predetermined size, and the weight was divided by the volume to calculate the density. From the actual measurement value of the density and the theoretical density calculated from the composition of the composite material sheet, the porosity was calculated by the following formula:

(Porosity)={1−(Actual Measurement Value of Density/Theoretical Density)}×100

(2) Air Permeability

The Gurley value (the time in seconds required for 100 cc of air to permeate a membrane at a pressure of 0.879 g/m$^2$) was checked in accordance with JIS P8117, and the air permeability was evaluated from the result.

(3) Strength

A test piece of 5 mm in width was cut out from the composite material sheet, and placed in a tensile tester with a chuck gap of 13 mm. Then, a tensile test was carried out at a test rate of 7.8 mm/min. The maximum stress during the test, which was divided by a cross-sectional area of the test piece, was defined as the strength.

(4) Shrinkage Percentage During Heating

A test piece of 4 cm×4 cm was cut out from the composite material sheet, and left for 30 minutes in a constant-temperature bath at 150° C., and the shrinkage percentage of the composite material sheet was measured from the rate of decrease in dimension between before and after the heating.

Table 3 shows the values of the porosity, air permeability, strength, and shrinkage percentage during heating for the composite material sheets S1 to S7, which were checked in the ways described above. Further, Table 3 also shows together the values of the porosity, air permeability, strength, and shrinkage percentage during heating, which were checked for the polyethylene microporous membrane (20 μm in thickness) as a comparative example.

aluminum foil, dried, and then extended by applying pressure with a roller, to which a current collecting tab was attached to prepare a positive electrode.

In this case, the applied amount of the positive electrode mixture per unit area was adjusted to 14.0 mg/cm$^2$, and the

TABLE 3

| Type of Composite Material Sheet (Separator) | Type of Slurry (Silica) | Average Particle Size (μm) | General Particle Shape Index (—) | Porosity (%) | Air Permeability (sec/100 cc) | Strength (MPa) | Shrinkage Percentage during Heating (%) | Remarks |
|---|---|---|---|---|---|---|---|---|
| S1 | 1 | 1.6 | 0.32 | 53.8 | 1 | 2.9 | 0.0 | Outside Scope |
| S2 | 2 | 1.8 | 0.51 | 41.7 | 2 | 18.6 | 0.3 | |
| S3 | 3 | 1.5 | 0.62 | 39.3 | 9 | 20.5 | 0.5 | |
| S4 | 4 | 1.1 | 0.65 | 36.1 | 21 | 25.1 | 0.5 | |
| S5 | 5 | 1.3 | 0.72 | 29.8 | 28 | 24.8 | 0.0 | |
| S6 | 6 | 1.2 | 0.84 | 23.5 | 45 | 29.8 | 0.0 | |
| S7 | 7 | 1.0 | 0.91 | 12.1 | 1968 | 19.3 | 0.0 | Outside Scope |
| Comparative Example | — | — | — | 42.1 | 111 | 31.2 | 34.0 | Polyethylene Microporous Membrane |

As shown in Table 3, it was confirmed that the composite material sheets are high in porosity and also high in air permeability in the case of the composite material sheets (S2 to S6) in which the inorganic microparticles have a general particle shape index greater than 0.50 and 0.85 or less, whereas the composite material sheet (S7) in which the general particle shape index is greater than 0.85 is low in porosity, and also low in air permeability. It was also confirmed that the composite material sheet (S1) using the inorganic microparticles with a general particle shape index less than 0.50 is high in porosity and also high in air permeability, but low in strength.

In addition, it was confirmed that there is no difference found in shrinkage percentage during heating in any of the composite material sheets S1 to S7, whereas heating at 150° C. causes significant shrinkage in the case of the polyethylene microporous membrane as a comparative example.

Figure 4:
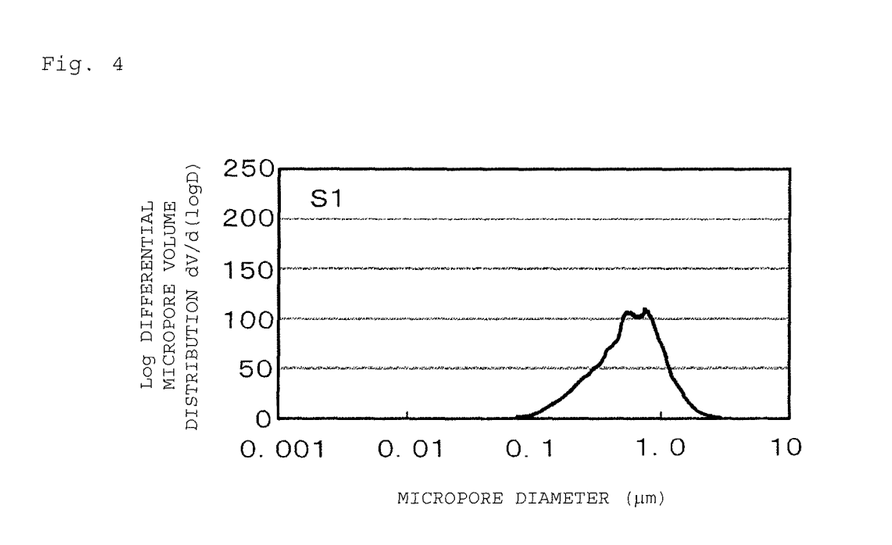
FIG. 4 is a diagram showing the relationship (dV/d(log D)) between the micropore diameter and Log differential micropore volume distribution measured for a composite material sheet S1 (separator) in Table 3.
Figure 5:
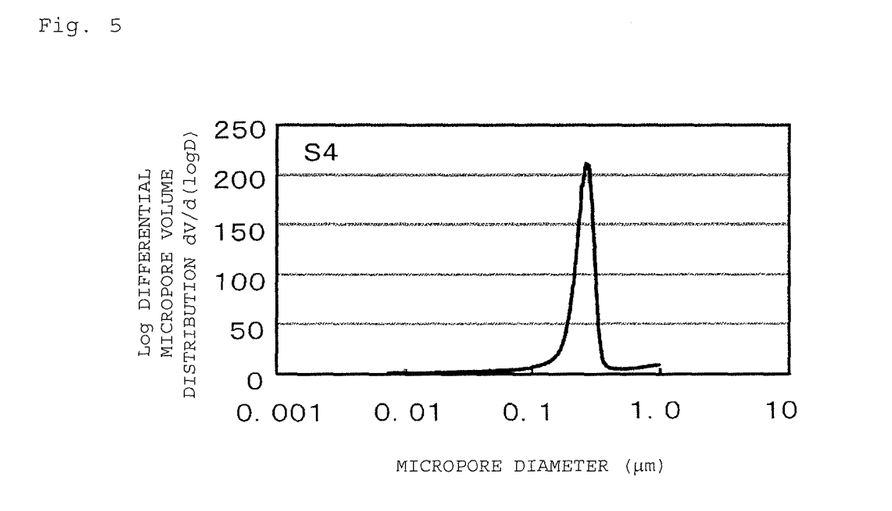
FIG. 5 is a diagram showing the relationship (dV/d(log D)) between the micropore diameter and Log differential micropore volume distribution measured for a composite material sheet S4 (separator) in Table 3.
Figure 6:
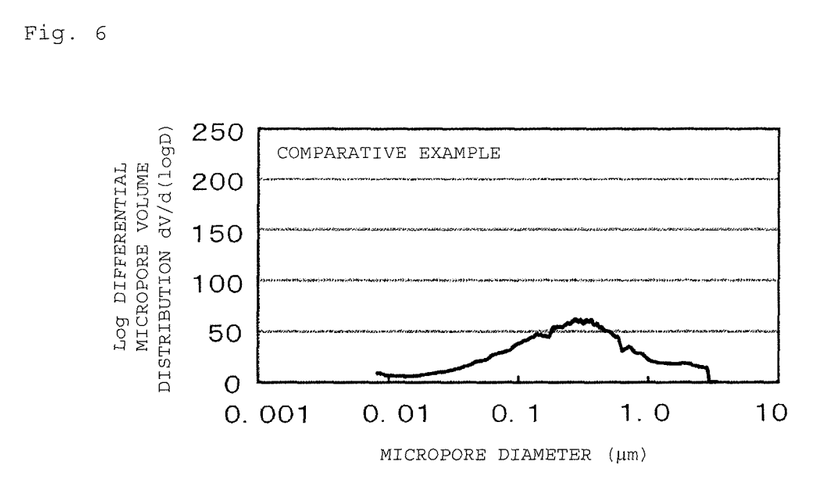
FIG. 6 is a diagram showing the relationship (dV/d(log D)) between the micropore diameter and Log differential micropore volume distribution measured for a polyethylene microporous film according to a comparative example in Table 3.

The micropore size distribution was measured by a mercury intrusion method for the composite material sheets S1, S4, and the polyethylene microporous membrane as a comparative example. FIGS. 4 to 6 show the relationship (dV/d (log D)) between the micropore diameter and Log differential micropore volume distribution.

It was confirmed that the micropore diameter distribution is broad (FIG. 4, FIG. 6) in the case of the composite material sheet S1 using the silica powder with a general particle shape index of 0.32 and the sheet (polyethylene macroporous membrane) according to the comparative example, whereas the distribution is narrow (FIG. 5) with a micropore diameter of 0.27 μm as a center in the case of the leading magnetic sheet S4 using the silica powder with a general particle shape index of 0.65.

Preparation and Evaluation of Lithium Ion Secondary Battery
Preparation of Positive Electrode Using a lithium-manganese composite oxide (LMO) represented by LiMn$_2$O$_4$ as a positive electrode active material, a carbon material as a conducting aid, an N-methyl-2-pyrrolidone (NMP) solution of polyvinylidene fluoride (PVDF) dissolved as a binder in a weight ratio of 88:6:6 in terms positive electrode active material:conducting aid:the binder, and the prepared materials were kneaded to prepare positive electrode mixture slurry. This positive electrode mixture slurry was applied onto a positive electrode current collector of filling density was adjusted to 2.7 g/mL. The unit capacity of the positive electrode was measured in a range of 3.0 to 4.3 V with the use of 1 mol/L LiPF6 as an electrolyte for an electrolyte solution; a mixed solvent of ethylene carbonate (EC) and diethyl carbonate (DEC) mixed at a volume ratio of 3:7 as a solvent; and a lithium metal as an opposite electrode. As a result, a unit capacity of 110 mAh was achieved per 1 g.
Preparation of Negative Electrode A spinel-type lithium-titanium composite compound represented by Li$_4$Ti$_5$O$_{12}$ as a negative electrode active material, carbon as a conducting aid, and an NMP solution of PVDF dissolved as a binder were combined at a ratio by weight of 93:3:4 in terms of the negative electrode active material, the conducting aid, and the binder. The prepared materials were kneaded to prepare a negative electrode mixture slurry. This negative electrode mixture slurry was applied onto a negative electrode current collector of aluminum foil, dried, and then extended by applying pressure with a roller, to which a current collecting tab was attached to prepare a negative electrode.

In this case, the applied amount of the negative electrode mixture per unit area was adjusted to 13.5 mg/cm$^2$, and the filling density was adjusted to 2.1 g/mL. The unit capacity of the negative electrode was measured in a range of 1.0 to 2.0 V with the use of 1 mol/L LiPF$_6$ as an electrolyte for an electrolyte solution; a mixed solvent of ethylene carbonate (EC) and diethyl carbonate (DEC) mixed at a volume ratio of 3:7 as a solvent; and a lithium metal as an opposite electrode. As a result, the unit capacity of 165 mAh was achieved per 1 g.
Preparation of Non-Aqueous Electrolyte Solution With the use of a mixed solvent obtained by mixing ethylene carbonate (EC) as a cyclic carbonate and diethyl carbonate (DEC) at a volume ratio of 3:7 as a non-aqueous solvent, LiPF$_6$ as an electrolyte was dissolved in the mixed solvent to a concentration of 1 mol/L to prepare a non-aqueous electrolyte solution.
Preparation of Battery Power storage elements obtained by interposing the composite material sheets (separators) S1 to S7 and the polyethylene microporous membrane as a comparative example (separator according to the comparative example) between the positive electrode (positive electrode layer) and negative electrode (negative electrode layer) prepared previously were stored in outer packagings composed of a laminate film including aluminum as an intermediate layer.

Thereafter, the non-aqueous electrolyte solution prepared in the way described above was injected into the outer packagings, and the openings of the outer packagings were sealed to obtain batteries (batteries B1 to B7 and a battery as a comparative example in Table 4).

An initial charge-discharge cycle was carried out for the obtained batteries (that is, the batteries B1 to B7 and the battery according to the comparative example in Table 4). More specifically, each battery was charged at 25° C. with a charging current adjusted to 4.8 mA (=0.4 C) until the voltage reached 2.75 V, and the charging current was then attenuated while the voltage was kept at 2.75 V, so that each battery was charged until the charging current reached 1/50 C. After 10 minutes, a constant current discharge was carried out under the conditions of a discharging current of 4.8 mA and a cutoff voltage of 1.25 V. After carrying out three cycles of charge and discharge with a charging/discharging current value adjusted to 12 mA (=10), one cycle of charge and discharge was carried out under the same conditions as in the initial charge-discharge cycle, and the discharge capacity in this case was calculated as 1 C.

For the batteries prepared in the way described above, the input/output DCR at 25° C. with an SOC (State of Charge) of 60% was measured and a reliability test was carried out, respectively, by methods described below.

(1) Input/Output DCR Measurement at 25° C. With SOC of 60%

When the capacity of 1 C obtained at 25° C. with a charging current adjusted to 4.8 mA was regarded as 100%, the respective batteries in Table 4 was charged to 60% of the capacity. The respective batteries were charged for 10 seconds with a charging current and an upper limit voltage adjusted to 12 mA (=10) and 2.75 V, respectively, and left for 10 minutes. Thereafter, the respective batteries were discharged for 10 seconds with a discharging current and a lower limit voltage adjusted to 12 mA and 1.25 V, respectively, and then left for 10 minutes. Subsequently, charge and discharge were carried out for 10 seconds while changing the charging/discharging current value from 24 mA (=2 C) through 72 mA (=6 C) to 120 mA (=10 C). The input DCR for each battery was calculated from the thus obtained voltage value after 10 seconds for each charging current value. Likewise, the output DCR for each battery was calculated from the thus obtained voltage value after 10 seconds for each discharging current value.

(2) Reliability Test

Each battery in Table 4 was left in a constant-temperature bath at 150° C. to measure the time until the battery function was lost, and evaluated for reliability and safety at high temperatures.

Table 4 together shows the results of the input/output DCR at 25° C. with an SOC of 60%, and of the reliability test for the batteries B1 to B7 and the battery according to the comparative example in Table 4, which were obtained respectively by using the composite material sheets S1 to S7 and the polyethylene microporous membrane according to the comparative example in Table 3.

TABLE 4

| Type of Battery | Type of Composite Material Sheet (Separator) | Input DCR at 25° C. (Ω) | Output DCR at 25° C. (Ω) | Time until Short Circuit (minute) | Remarks |
|---|---|---|---|---|---|
| B1 | S1 | Short Circuit | Short Circuit | — | Outside Scope |
| B2 | S2 | 0.82 | 0.86 | >60 | |
| B3 | S3 | 0.88 | 0.90 | >60 | |
| B4 | S4 | 1.25 | 1.32 | >60 | |
| B5 | S5 | 1.44 | 1.50 | >60 | |
| B6 | S6 | 1.55 | 1.53 | >60 | |
| B7 | S7 | 6.53 | 7.51 | >60 | Outside Scope |
| Comparative Example | Comparative Example | 1.10 | 1.13 | 18 | Polyethylene Microporous Membrane |

In the case of the battery B1 in Table 4 with the use of the composite material sheet S1 in Table 3 for a separator, in which the general particle shape index of the silica powder in the separator was less than 0.50, the characteristics were not able to be evaluated because of a short circuit during the initial charge and discharge.

In addition, it was confirmed that the input/output DCR is unfavorably high in the case of the battery B7 in Table 4 with the use of the composite material sheet S7 in Table 3 for a separator, in which the general particle shape index is greater than 0.85. On the other hand, the batteries B2 to B6 in Table 4 with the use of the composite material sheets S2 to S6 in Table 3 for separators, in which the general particle shape index of the silica powder falls within a range of 0.50 to 0.85, exhibited the input/output DCR equivalent to that of the battery with the use of the polyethylene porous membrane according to the comparative example for a separator.

In the reliability rest of leaving at 150° C., a short circuit was confirmed in a short period of time in the case of the battery with the use of the polyethylene porous membrane according to the comparative example for a separator. On the other hand, it was confirmed that the batteries B2 to B7 in Table 4 with the use of, for separators, the composite material sheets within the scope of the present invention are excellent in reliability due to the longer time until short circuit as compared with the comparative example.

In the case of the separator for a power storage device which is composed of the composite material including the inorganic microparticles and the organic binder, it is known that the filling property of the inorganic microparticles determines the porosity and air permeability of the separator for a power storage device, and it was confirmed from Example 1 described above that in the separator composed of a composite material for a power storage device (the separator for a battery) according to the present invention, (a) the filling property of the inorganic microparticle is affected by the particle shape of the inorganic microparticle, (b) favorable properties (strength, porosity, air permeability) are achieved as a separator with a general particle shape index in a range of 0.50 to 0.85 when the particle shape of the inorganic microparticle is represented by the index referred to as a general particle shape index calculated from the product of the degree of circularity and the degree of smoothness, and (c) favorable input/output DCR characteristics are achieved when the separator according to the present invention is used to constitute a battery.

In addition, it was confirmed that when the general particle shape index is excessively large (greater than 0.85), the densely packed inorganic microparticles decreases the porosity of the composite material sheet, thereby resulting in an increase in air permeability, and a battery with the use of this sheet for a separator has input/output DCR characteristics worsened.

On the other hand, it was confirmed that when the general particle shape index is excessively small (below 0.50), micropores formed by gaps among the inorganic microparticles undergo an excessive increase in size, thereby resulting in defects such as the decreased strength of the composite material sheet and difficulty in suppressing or preventing short circuit between electrodes.

Furthermore, the separator for a battery, which is composed of the composite material including the inorganic microparticles and the organic binder, has the feature of the narrower micropore diameter distribution as compared with the separator of the polyethylene microporous membrane for a battery, and this feature suggests that the distribution of the electrolyte solution and the movement of lithium ions are uniform in the separator in the former case as compared with the latter case. Therefore, improvements in reliability and life for lithium ion batteries can be expected according to the present invention.

The battery using the composite material sheet for a separator has input/output DCR characteristics equivalent to those of a battery with the use of the conventional polyethylene microporous membrane for a separator. Furthermore, the battery with the use of the composite material sheet for a separator is superior in reliability at high temperatures to the battery with the use of the conventional polyethylene microporous membrane for a separator. This is because the composite material sheet is hardly shrunk even under high temperatures.

Example 2

In Example 2, crushed silica with an average particle size of 5.3 μm and a general particle shape index of 0.52 was used as the inorganic microparticles to prepare composite material sheets each with a pigment volume concentration PVC of 65%. Table 5 shows specifications of slurries prepared by a method described below, which were used for the preparation of the composite material sheet.

TABLE 5

| | |
|---|---|
| Silica | 100 |
| Water | 50 |
| Aqueous Polyvinyl Alcohol Solution | 339.7 |
| Propylene Glycol | 2.7 |

The slurry was prepared with the use of a ball mill, where the average particle size and particle shape index of the silica powder were adjusted by the grinding time thereof.

The silica powder, an aqueous polyvinyl alcohol solution (concentration: 8% by weight), 1,2-propanediol, and water were put in a 500 mL pot. Grinding media of 5 mm φ PSZ were put therein, and a slurry was prepared by mixing with the use of a tumbling ball mill.

Table 6 shows the average particle size and general particle shape index of silica particles in the slurry in the case of adjusting the mixing time to 1 hour, 6 hours, 12 hours, 24 hours, and 36 hours. It is to be noted that the methods for evaluating the average particle size and the general particle shape index were the same as those in Example 1.

TABLE 6

| Type of Slurry | Mixing Time | Average Particle Size (μm) | Degree of Circularity (—) | Degree of Smoothness (—) | General Particle Shape Index (—) |
|---|---|---|---|---|---|
| Slurry 8 | 1 hour | 4.1 | 0.74 | 0.73 | 0.54 |
| Slurry 9 | 6 hours | 2.9 | 0.76 | 0.76 | 0.58 |
| Slurry 10 | 12 hours | 1.4 | 0.82 | 0.78 | 0.64 |
| Slurry 11 | 24 hours | 0.2 | 0.85 | 0.80 | 0.68 |
| Slurry 12 | 36 hours | 0.1 | 0.88 | 0.80 | 0.70 |

The slurry prepared by the method described above was used to prepare composite material sheets in the same manner as in Example 1. For each of the composite material sheets prepared, the porosity, air permeability, and strength were checked in the same manners as in Example 1. The results are shown in Table 7.

TABLE 7

| Type of Composite Material Sheet (Separator) | Type of Slurry | Average Particle Size (μm) | General Particle Shape Index (—) | Porosity (%) | Air Permeability (sec/100 cc) | Strength (MPa) |
|---|---|---|---|---|---|---|
| S8 | 8 | 4.1 | 0.54 | 51.4 | 1 | 2.5 |
| S9 | 9 | 2.9 | 0.58 | 43.2 | 2 | 17.6 |
| S10 | 10 | 1.4 | 0.64 | 38.8 | 8 | 21.2 |
| S11 | 11 | 0.2 | 0.68 | 25.9 | 40 | 25.4 |
| S12 | 12 | 0.1 | 0.70 | 10.8 | 3298 | 28.1 |

As shown in Table 7, it was confirmed that with the decrease in the average particle size of the inorganic microparticles (silica powder), the porosity is decreased, the air permeability is also decreased, and the strength is increased. For example, it was confirmed that in the case of the composite material sheet in which the inorganic microparticles (silica powder) have an average particle size of less than 0.2 μm (the composite material sheet S12 in Table 7), the porosity is low, and the air permeability is also low. When the average particle size is less than 0.2 μm, the porosity is low, and the air permeability is also low, which is supposed to be due to small gaps formed among the silica powders. In addition, it was confirmed that in the case of the composite material sheet in which the silica powders have an average particle size of greater than 3.0 μm (the composite material sheet S8 in Table 7), the porosity is high, the air permeability is also excessively high, and moreover, the strength is significantly decreased.

The composite material sheets S8 to S12 in Table 7 were used for separators to prepare batteries B8 to B12 in Table 8 (lithium ion secondary batteries) in the same manner as in Example 1. In addition, as a comparative example, a polyethylene microporous membrane was used to prepare a battery according to the comparative example. Then, for each of the batteries prepared, the input/output DCR was measured at 25° C. with an SOC of 60%, and a reliability test was carried out. The results are shown together in Table 8.

TABLE 8

| Type of Battery | Type of Composite Material Sheet (Separator) | Input DCR at 25° C. (Ω) | Output DCR at 25° C. (Ω) | Time until Short Circuit (minute) | Remarks |
|---|---|---|---|---|---|
| B8 | S8 | Short Circuit | Short Circuit | — | Outside Scope |

TABLE 8-continued

| Type of Battery | Type of Composite Material Sheet (Separator) | Input DCR at 25° C. (Ω) | Output DCR at 25° C. (Ω) | Time until Short Circuit (minute) | Remarks |
|---|---|---|---|---|---|
| B9 | S9 | 0.78 | 0.82 | >60 | |
| B10 | S10 | 0.91 | 0.92 | >60 | |
| B11 | S11 | 1.32 | 1.46 | >60 | |
| B12 | S12 | 5.72 | 6.33 | >60 | Outside Scope |
| Comparative Example | Comparative Example | 1.10 | 1.13 | 18 | Polyethylene Microporous Membrane |

As shown in Table 8, the characteristics were not able to be evaluated because of a short circuit during the initial charge and discharge in the case of the battery (battery B8 in Table 8) with the use of the composite material sheet (composite material sheet S8 in Table 7) for a separator, in which the silica powders have an average particle size of greater than 3.0 μm.

In addition, it was confirmed that the input/output DCR is increased in the case of the battery B12 in Table 8 with the use of the composite material sheet (S12 in Table 7) for a separator, in which the silica powders have an average particle size of less than 0.2 μm. This is supposed to be due to the low porosity and the low air permeability.

On the other hand, it was confirmed that the batteries B9, B10, B11 in Table 8 with the use of the composite material sheets (9, S10, S11 in Table 7 for separators, in which the average particle size falls within a range of 0.2 to 3.0 exhibit the input/output DCR equivalent to that of the battery with the use of the polyethylene porous membrane according to the comparative example for a separator.

It was also confirmed from the results in Example 2 described above that in a range of 0.50 to 0.85 for the general particle shape index of the inorganic microparticles, when the average particle size falls within a range of 0.2 to 3.0 μm, composite material sheets are achieved which have porosity, air permeability, strength, shrinkage percentage during heating adapted to separators for lithium ion secondary batteries.

It is to be noted that when the inorganic microparticles have an average particle size of less than 0.2 μm, the porosity is low, and the air permeability is low, which is supposed to be due to small gaps formed among the inorganic microparticles.

In addition, it becomes difficult to suppress short circuit between electrodes when the average particle size of the inorganic microparticles is greater than 3.0 μm, which is believed to be due to an excessive increase in the size of micropores formed among the inorganic microparticles.

From the above results, it was confirmed that the use of the composite material sheet including the inorganic microparticles with a general particle shape index in a range of 0.50 to 0.85 and an average particle size in a range of 0.2 to 3.0 μm for a separator, and the organic binder achieves a lithium ion secondary battery that has input/output DCR characteristics equivalent to those of a lithium ion secondary battery with the use of a conventional polyethylene microporous membrane for a separator, and has higher reliability at high temperatures as compared with the lithium ion secondary battery with the use of the conventional polyethylene microporous membrane for a separator.

Example 3

In Example 3, the silica powder of silica 4 in Table 1 (the silica powder with a general particle shape index of 0.65) was used as the inorganic microparticles to prepare a slurry as shown in Table 9, and composite material sheets were prepared with a pigment volume concentration PVC in a range of 50% to 85%. Table 9 shows specifications of slurries prepared by a method described below, which were used for the preparation of the composite material sheet.

TABLE 9

| | Type of Slurry | | | | |
|---|---|---|---|---|---|
| | Slurry 13 | Slurry 14 | Slurry 15 | Slurry 16 | Slurry 17 |
| Silica | 100 | 100 | 100 | 100 | 100 |
| Water | 50 | 50 | 50 | 50 | 50 |
| Aqueous Polyvinyl Alcohol Solution | 630.9 | 516.2 | 339.7 | 157.7 | 113.7 |
| Propylene Glycol | 5.1 | 4.1 | 2.7 | 1.3 | 0.9 |
| PVC | 50% | 55% | 65% | 80% | 85% |

The prepared slurry was then used to prepare composite material sheets S13 to S17 in Table 10 in the same manner as in Example 1. It is to be noted that the composite material sheet S15 is the same as the composite material sheet S4 in Table 3.

Then, for each of the composite material sheets prepared, the porosity, air permeability, strength, and shrinkage percentage during heating were checked in the same manners as in Example 1. The results are shown in Table 10.

TABLE 10

| Type of Composite Material Sheet (Separator) | Type of Slurry | PVC (%) | Porosity (%) | Air Permeability (sec/100 cc) | Strength (MPa) | Shrinkage Percentage during Heating (%) |
|---|---|---|---|---|---|---|
| S13 | 13 | 50 | 14.8 | 1590 | 33.8 | 6.5 |
| S14 | 14 | 55 | 26.1 | 25 | 31.5 | 0.5 |
| S15 | 15 | 65 | 34.0 | 21 | 25.1 | 0.5 |
| S16 | 16 | 80 | 37.3 | 2 | 8.0 | 0.0 |
| S17 | 17 | 85 | 43.4 | 1 | 1.5 | 0.0 |

As shown in Table 10, it was confirmed that with the increase in the pigment volume concentration PVC of the inorganic microparticles (silica powder), the porosity is increased, the air permeability is also increased, and the strength is decreased in the obtained composite material sheets.

Thus it was confirmed that in the case of the composite material sheet with the use of the inorganic microparticles (silica powder) with a pigment volume concentration PVC of less than 55% (S13 in Table 10), the porosity is decreased, and the air permeability is also decreased. This is believed to be because in the case of using the inorganic microparticles (silica powder) with a pigment volume concentration PVC of less than 55%, the organic binder present in gaps filled with the silica powder undergoes an increase in volume to decrease the porosity, and also decrease the air permeability.

In addition, with the increase in the pigment volume concentration PVC of the inorganic microparticles (silica powder), the composite material sheets were decreased in strength. In addition, it was confirmed that the shrinkage percentage during heating is high in the case of the composite material sheet S13 in Table 10 with a pigment volume concentration PVC of 50%. This is believed to be due to the increased volume of the organic binder present in the gaps filled with the silica powder.

Furthermore, the composite material sheets S13 to S17 in Table 10 were used for separators to prepare batteries B13 to B17 in Table 11 (lithium ion secondary batteries). It is to be noted that the battery B15 is the same as the battery B4 in Table 4. Also, as a comparative example, a polyethylene microporous membrane was used to prepare a battery according to the comparative example.

Then, the input/output DCR was measured at 25° C. with an SOC of 60%, and a reliability test was carried out for each of the batteries prepared. The results are shown together in Table 11. It is to be noted that the method for preparing the batteries and the methods for evaluating characteristics are the same as those in Example 1.

TABLE 11

| Type of Battery | Type of Composite Material Sheet (Separator) | Input DCR at 25° C. (Ω) | Output DCR at 25° C. (Ω) | Time until Short Circuit (minute) | Remarks |
|---|---|---|---|---|---|
| B13 | S13 | 4.44 | 4.91 | >60 | Outside Scope |
| B14 | S14 | 1.52 | 1.52 | >60 | |
| B15 | S15 | 1.25 | 1.32 | >60 | |
| B16 | S16 | 0.91 | 0.93 | >60 | |
| B17 | S17 | 0.89 | 0.89 | 48 | |
| Comparative Example | Comparative Example | 1.10 | 1.13 | 18 | Polyethylene Microporous Membrane |

Table 11 confirms that the input/output DCR is high in the case of the battery B13 with the use of, for a separator, the composite material sheet S13 in Table 10 with the low pigment volume concentration PVC of 50%. This is believed to be due to the low porosity, and also low air permeability of the composite material sheet S13 (Table 10). On the other hand, the batteries B14, B15, B16, B17 with the use of separators, S14, S15, S16, S17 in Table 10 with a pigment volume concentration PVC of 55% or more exhibited an input/output DCR equivalent to that of the battery with the use of the polyethylene porous membrane according to the comparative example for a separator.

In addition, it is understood that the batteries B13, B14, B15, B16, B17 in Table 11 are excellent in reliability due to the longer time until short circuit as compared with the comparative example. However, it was confirmed that in the case of the battery B17 with the high pigment volume concentration PVC of 85%, the time until short circuit is longer as compared with the comparative example, while the time until short circuit is somewhat shorter as compared with the other batteries.

From the above results, it was confirmed that the use of the composite material sheet including the inorganic microparticles with a pigment volume concentration of 55% or more and the organic binder for a separator achieves a lithium ion secondary battery that has input/output DCR characteristics equivalent to those of a battery with the use of a conventional polyethylene microporous membrane for a separator, and has higher reliability at high temperatures as compared with the lithium ion secondary battery with the use of the conventional polyethylene microporous membrane for a separator.

It is to be noted that in the case of the inorganic microparticles with a pigment volume concentration PVC of less than 55%, the input/output DCR is increased, whereas the reliability is decreased, which is believed to be due to the porosity decreased, and the air permeability also decreased, by the increased volume of the organic binder present in gaps among the inorganic microparticles.

It is understood from the above results that the pigment volume concentration PVC of the composite material sheet has a preferred range of 55 to 80%. Further, in this range, the composite material sheet can be prevented from being broken when the composite material sheet is handled in the process of preparing a battery due to the high strength of the composite material sheet.

In addition, there is a tendency for the amount of the organic binder for maintaining the strength of the composite material sheet to be insufficient if the pigment volume concentration PVC is greater than 80%, and also in this respect, desirably, the pigment volume concentration PVC typically falls within a range of 55 to 80%.

Furthermore, the pigment volume concentration PVC in the case of falling within a range of 55 to 65%, which is particularly preferred, makes it possible to further increase the strength of the composite material sheet.

It is to be noted that while the power storage device has been described with reference to the lithium ion secondary battery as an example in Examples 1 to 3 described above, for example, the same configuration as in the case of the lithium ion secondary battery shown in FIGS. 1 to 3 can be adopted for a lithium ion capacitor by using, as the positive electrode layer, an activated carbon-containing mixture layer provided as a positive electrode active material layer on an aluminum foil as a positive electrode current collector layer, and using, as the negative electrode layer, a graphite-containing mixture layer provided as a negative electrode active material layer on a copper foil as a negative electrode current collector layer, which is further pre-doped with lithium ions. In that case also, it is confirmed that the use of the same composite material sheet as in Examples 1 to 3 as a separator described above achieves an effect based on the effects achieved by the lithium ion secondary batteries according to Examples 1 to 3 described above.

Example 4

Figure 7:
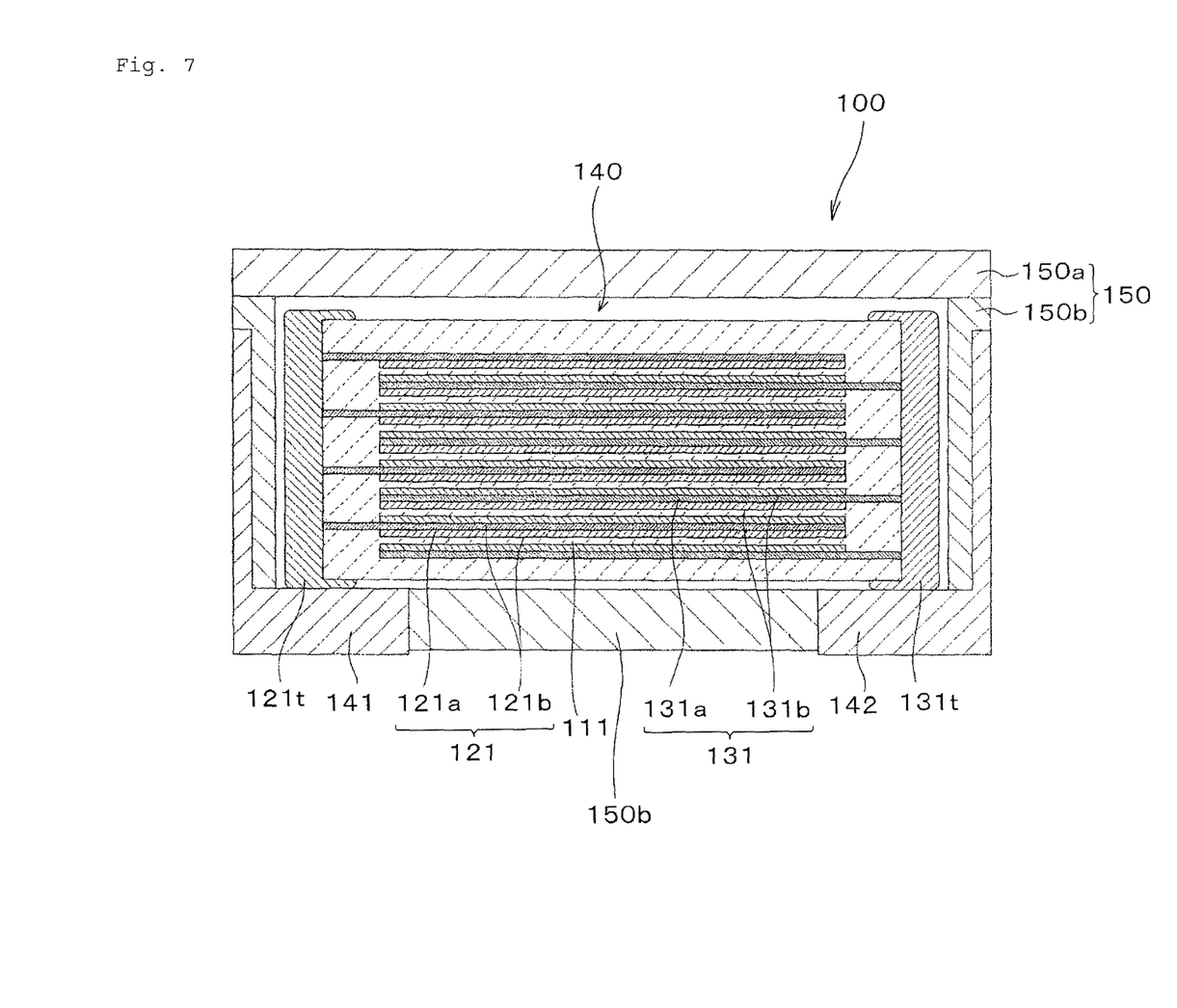
FIG. 7 is a cross-sectional view illustrating the configuration of a power storage device (electric double layer capacitor) according to an example (Example 4) of the present invention.

FIG. 7 is a diagram illustrating a power storage device (an electric double layer capacitor in Example 4) according to another example of the present invention. This electric double layer capacitor 100 is, as shown in FIG. 7, structured such that a stacked body 140 formed by stacking a positive electrode layer 121 of a positive electrode active material 121*b* provided on both sides of a positive electrode current collector 121*a* and a negative electrode layer 131 of a negative electrode active material 131*b* provided on both sides of a negative electrode current collector 131*a*, with a separator layer 111 interposed therebetween, and provided with a positive electrode external terminal electrode 121*t* and a negative electrode external terminal electrode 131*t* at both ends, is housed along with an electrolyte solution in a package 150 composed of a lid body 150*a* and a base 150*b*, and the package 150 is formed with a positive electrode package electrode 141 and a negative electrode package electrode 142 so as to wrap around from both ends to the lower side.

Also in this electric double layer capacitor structured as shown in FIG. 7, it is confirmed that the use of, as the separator layers, the composite material sheets as described in Examples 1 to 3 above achieves the same effect as in the case of the lithium ion secondary batteries according to Examples 1 to 3 described above.

It is to be noted that the present invention is not limited to the respective examples described above, various applications and modifications can be made within the scope of the invention, regarding the constituent materials of, and the methods for forming the positive electrode layer and the negative electrode layer, the specific configuration of the power storage element (the form of staking the positive electrode layer, the negative electrode layer, and the separator, the number of layers stacked, etc.), the type of the electrolyte solution, the configuration and structure material of the outer packaging, etc.

DESCRIPTION OF REFERENCE SYMBOLS

1 Battery (lithium ion secondary battery)
10 Power storage element
11 Positive electrode layer
12 Negative electrode layer
13 Separator
14 Non-aqueous electrolyte solution
20 Outer packaging
40a Positive electrode terminal
40b Negative electrode terminal
41 Current collector member
100 Electric double layer capacitor
111 Separator layer
121 Positive electrode layer
121a Positive electrode current collector layer
121b Positive electrode active material
121t Positive electrode external terminal electrode
131 Negative electrode layer
131a Negative electrode current collector layer
131b Negative electrode active material
131t Negative electrode external terminal electrode
140 Stacked body
141 Positive electrode package electrode
142 Negative electrode package electrode
150 Package
150a Lid body
150b Base

The invention claimed is:

1. A separator for a power storage device, comprising a composite material which comprises inorganic microparticles and an organic binder, wherein
  (a) the composite material has a pigment volume concentration (PVC) which is determined by the following formula of 55% or more, PVC=(Volume of Inorganic Microparticles)÷(Volume of Inorganic Microparticles+Volume of Organic Binder)×100    (1)

in which the Volume of Inorganic Microparticles is the weight of the inorganic microparticles divided by the density of the inorganic microparticles, and the Volume of Organic Binder is the weight of the organic binder divided by the density of the organic binder; and
  (b) the inorganic microparticles have an average particle size in a range of 0.2 to 3.0 μm, and a general particle shape index in a range of 0.51 to 0.84, wherein the general particle shape index is the product of the degree of circularity for the inorganic microparticles of the formula (2), and the degree of smoothness for the inorganic microparticles of formula (3), Degree of Circularity=Equivalent Circle Diameter÷Equivalent Ellipse Major Axis    (2)

Degree of Smoothness=Equivalent Ellipse Outer Perimeter÷Outer Perimeter    (3).

2. The separator for a power storage device according to claim 1, wherein the composite material has a pigment volume concentration PVC in a range of 55 to 80%.

3. The separator for a power storage device according to claim 1, wherein the composite material has a pigment volume concentration PVC in a range of 55 to 65%.

4. The separator for a power storage device according to claim 3, wherein the inorganic microparticles have an average particle size in a range of 1 to 1.8 μm.

5. The separator for a power storage device according to claim 4, wherein the inorganic microparticles are an oxide or nitrate.

6. The separator for a power storage device according to claim 4, wherein the inorganic microparticles are a member selected from the group consisting of silica, alumina, titania, barium titanate, silicon nitride and aluminum nitride.

7. The separator for a power storage device according to claim 1, wherein the inorganic microparticles are an oxide or nitrate.

8. The separator for a power storage device according to claim 1, wherein the inorganic microparticles are a member selected from the group consisting of silica, alumina, titania, barium titanate, silicon nitride and aluminum nitride.

9. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 8.

10. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 7.

11. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 6.

12. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 5.

13. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 4.

14. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 3.

15. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 2.

16. A power storage device comprising a positive electrode layer comprising a positive electrode active material and a current collector, and a negative electrode layer comprising a negative electrode active material and a current collector, stacked so as to be opposed to each other with a separator interposed therebetween, and housed in an outer packaging together with an electrolyte solution, wherein the separator for a power storage device is a separator according to claim 1.

17. A power storage device according to claim 16 which is a Li ion secondary battery.

18. A power storage device according to claim 16 which is a capacitor.

19. A power storage device according to claim 9 which is a Li ion secondary battery.

20. A power storage device according to claim 9 which is a capacitor.

* * * * *